United States Patent [19]

Baumeister

[11] Patent Number: 4,774,600
[45] Date of Patent: Sep. 27, 1988

[54] VIDEO TAPE EDITING TECHNIQUE

[75] Inventor: Hans P. Baumeister, Churchville, N.Y.

[73] Assignee: Eastman Kodak Company, Rochester, N.Y.

[21] Appl. No.: 730,515

[22] Filed: May 6, 1985

[51] Int. Cl.[4] .............................................. G11B 27/02
[52] U.S. Cl. ................................. 560/14.1; 360/14.3; 360/15
[58] Field of Search ........................... 360/14.1–14.3, 360/15; 358/903

[56] References Cited

U.S. PATENT DOCUMENTS

| | | |
|---|---|---|
| 3,953,881 | 4/1976 | Yamagimachi et al. |
| 3,987,484 | 10/1976 | Bosche et al. |
| 4,100,607 | 7/1978 | Skinner ........................ 360/14.2 X |
| 4,148,070 | 4/1979 | Taylor . |
| 4,152,719 | 5/1979 | Kellar ................................. 358/22 |
| 4,163,249 | 7/1979 | Michael et al. |
| 4,172,264 | 10/1979 | Taylor et al. |
| 4,183,058 | 1/1980 | Taylor . |
| 4,210,785 | 7/1980 | Huber et al. |
| 4,210,940 | 7/1980 | Prysby et al. |
| 4,218,710 | 8/1980 | Kashigi et al. ................ 358/183 |
| 4,224,644 | 9/1980 | Lewis et al. |
| 4,286,291 | 8/1981 | Taylor et al. |
| 4,302,776 | 11/1981 | Taylor et al. |
| 4,308,563 | 12/1981 | Gohda et al. |
| 4,365,313 | 12/1982 | Menezes et al. ............ 360/14.3 X |
| 4,394,694 | 7/1983 | Ninoymiya et al. ............. 360/14.3 |
| 4,496,997 | 1/1985 | Ohtsuki ............................. 360/15 X |
| 4,591,931 | 5/1986 | Baumeister ................... 360/14.3 X |

FOREIGN PATENT DOCUMENTS

| | | | |
|---|---|---|---|
| 58-171724 | 8/1983 | Japan ................................ 360/15 |
| 2029665 | 5/1980 | United Kingdom . | |

OTHER PUBLICATIONS

"VTR Editing Systems Using Microphones"; Hamalainen et al., Int'l Broadcast Eng. (GB); vol. 10, No. 168, Nov. 1979, pp. 12–13.
"Automated Video Tape Editing System"; Toshiba Review, Japan, No. 16, Oct. 1971; Shimada et al. pp.5–10.

Primary Examiner—Aristotelis M. Psitos
Attorney, Agent, or Firm—William F. Noval

[57] ABSTRACT

A video tape editing technique in which video information recorded on a first magnetic tape is edited and recorded on a second magnetic tape in a selected order. The technique includes playing back video information recorded on a first magnetic tape and displaying the played back information on a video monitor. The start and end fields or frames of edited segments of video information on the first magnetic tape are designated. Upon designating the start field or frame of an edited segment, at least a portion of such field or frame is stored in reduced format in memory and simultaneously the location of such start field or frame is also stored in memory. Upon designating the end field or frame, its location is also stored in memory. After all of the edited segments have been designated, the reduced format portions are read from memory and displayed in a matrix on the video monitor and the order in which the designated segments of video information are to be recorded on a second magnetic taqpe are selected from the matrix display. Thereafter, playback of the first magnetic tape is controlled so that the designated segments of video information are sequentially recorded on a second magnetic tape in the selected order.

6 Claims, 4 Drawing Sheets

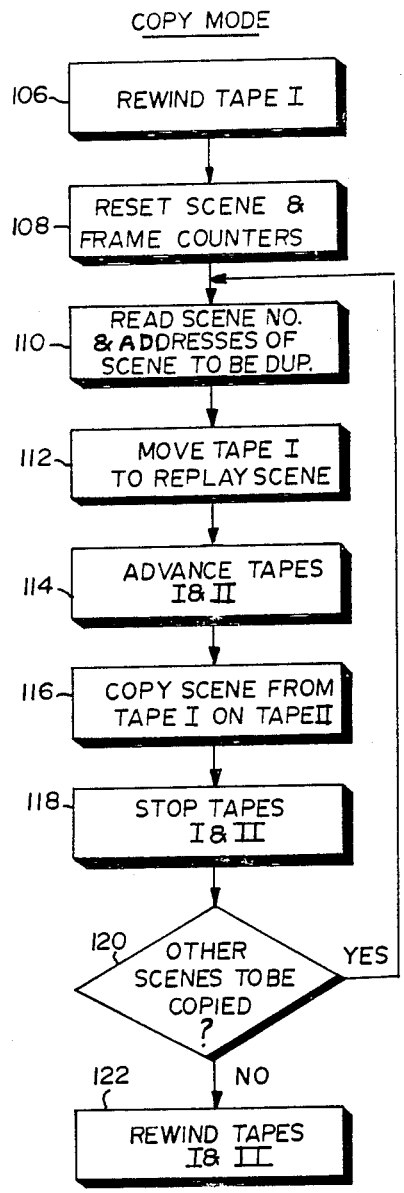
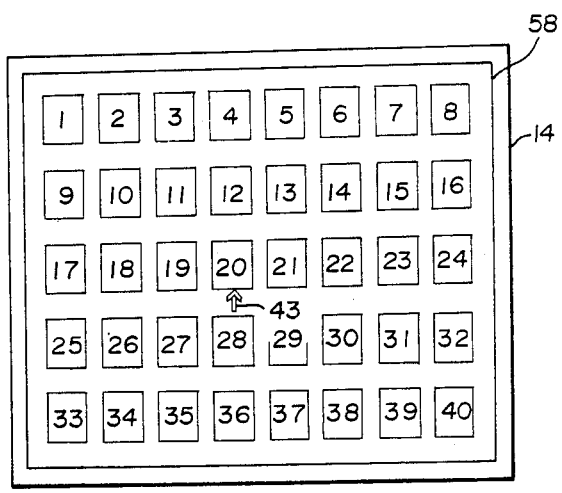
FIG. 5
FIG. 4

VIDEO TAPE EDITING TECHNIQUE

BACKGROUND OF THE INVENTION

This invention relates in general to a technique for editing information recorded on a first magnetic tape and for recording the edited segments on a second magnetic tape.

Video information recorded on magnetic tape frequently has segments which are of less interest for playback than other segments. Thus, for example, in the recording of broadcast movies, commercials are frequently interspersed between segments of the movie. When playing back the recorded movie, it may be desirable to skip the commercials so that the continuity of story line or action may be shown uninterrupted. Similarly, when a video camera is used to record sequences on magnetic tape, it may be desirable to edit the sequences to eliminate showing out of focus or uninteresting scenes. It may also be desirable to rearrange the sequences in an order other than the order in which they were recorded on the tape.

It is possible, of course, to edit the video information on one magnetic tape for recording on a second tape, by manually controlling first and second video tape recorders. However, this technique is cumbersome, time consuming and not readily adaptable to recording sequences out of order on the second tape. In U.S. Pat. No. 4,210,940, issued July 1, 1980, for "VARIABLE FORMAT TAPE REPLAY SYSTEM", by D. G. Prysby et al and U.S. Pat. No. 4,210,785, issued July 1, 1980, for "TAPE REPLAY SYSTEM", by W. D. Huber et al, there is disclosed a tape playback system including a controller in which tape segments on a recorded tape may be selectively designated for replay in any order regardless of the order of recording on the tape. In the disclosed system, the operator views the recorded material on a monitor and notes the start and end addresses of tape segments to be replayed. When all of the tape segments have been noted, the operator must enter the start and end addresses by way of a keyboard into memory in the controller, and also an identification number for the segment. Upon replay, the controller automatically replays the designated segments in the selected order. This system is both inconvenient and time consuming in that it requires the operator to write down the start and end addresses of selected tape segments for replay and then to manually enter these addresses into memory in the controller. U.S. Pat. No. 4,224,644, issued Sept. 23, 1980 for "METHOD AND APPARATUS FOR CONTROLLING A TAPE PLAYER RECORDER FOR RETRIEVING AND PLAYING PRERECORDED INFORMATION", by D. E. Lewis et al, discloses a similar system wherein the start and end address of selected segments are automatically read into memory by the actuation of a number button. Thereafter, the addresses of selected tape segments and the order of playback is recorded on the beginning of the tape so that the tape cassette may be removed. When the cassette is re-inserted, the contents of the recorded addresses may be retrieved. This system is disadvantageous because a separate list of the subject matter of the recorded segments designated for playback must be provided to an operator. Moreover, the operator has no visual reference as to the subject matter of the tape.

U.S. Pat. No. 4,286,291, for "DIGITAL VIDEO PROCESSOR" issued Aug. 25, 1981, by R. J. Taylor et al and U.S. Pat. No. 4,302,776, for "DIGITAL STILL PICTURE STORAGE SYSTEM WITH SIZE CHANGE FACILITY" issued Nov. 24, 1981, by R. J. Taylor et al, disclose a digital system for storing and processing still pictures in a digital format. The system includes a disc or tape which stores a plurality of digital still pictures which are compressible for storing in a reduced format. A matrix of miniature pictures may be stored in a frame store and displayed together on a television screen. The pictures may be identified with a number or code, and by selecting a sequence of numbers, the user can put together a desired sequence of pictures. A light pen may be used to make this selection. The still pictures may be freeze frames of clips from a video tape. Although the digital system described in these patents may be usable for the purposes for which it was intended, it is expensive and complex and not readily adaptable for use as a low cost consumer editor.

There is thus a need for a simple, low cost, easy to use consumer editor for facilitating the copying of edited segments from one tape onto a second tape in an order other than the order in which they were recorded.

SUMMARY OF THE INVENTION

According to the present invention there is provided a video tape editing technique which is simple, low cost and easy to use and which provides a visual sampling of edited scenes for use in reordering edited segments for copying on a second tape. According to an aspect of the invention, video information recorded sequentially on a first magnetic tape is played back and displayed on a video monitor. An operator designates the location of the start of a segment of video information on the first magnetic tape to be copied on the second magnetic tape. Simultaneously there is stored in memory the address or location of the start of the segment and in a reduced format, a portion of the recorded sequence. The operator then selects the end of a designated segment and the location thereof is stored in memory. This process is repeated for each segment of video information on the first magnetic tape to be copied onto a second tape. Thereafter, the operator causes the reduced format segment portions stored in memory to be displayed in a matrix on the video monitor and selects from the displayed matrix the sequence in which the segments are to be copied on the second tape. In a copy mode, the first and second video tapes are controlled to copy onto the second tape the designated edited segments recorded on the first tape in the selected order.

DESCRIPTION OF THE DRAWINGS

In the accompanying drawings, like numbers indicate like elements.

FIG. 4 is a flow diagram of the COPY mode of operation of the system of FIG. 1; and FIG. 5 is a diagrammatic view of a video monitor depicting a matrix of reduced format portions of edited segments.

DESCRIPTION OF THE PREFERRED EMBODIMENT

Figure 1:
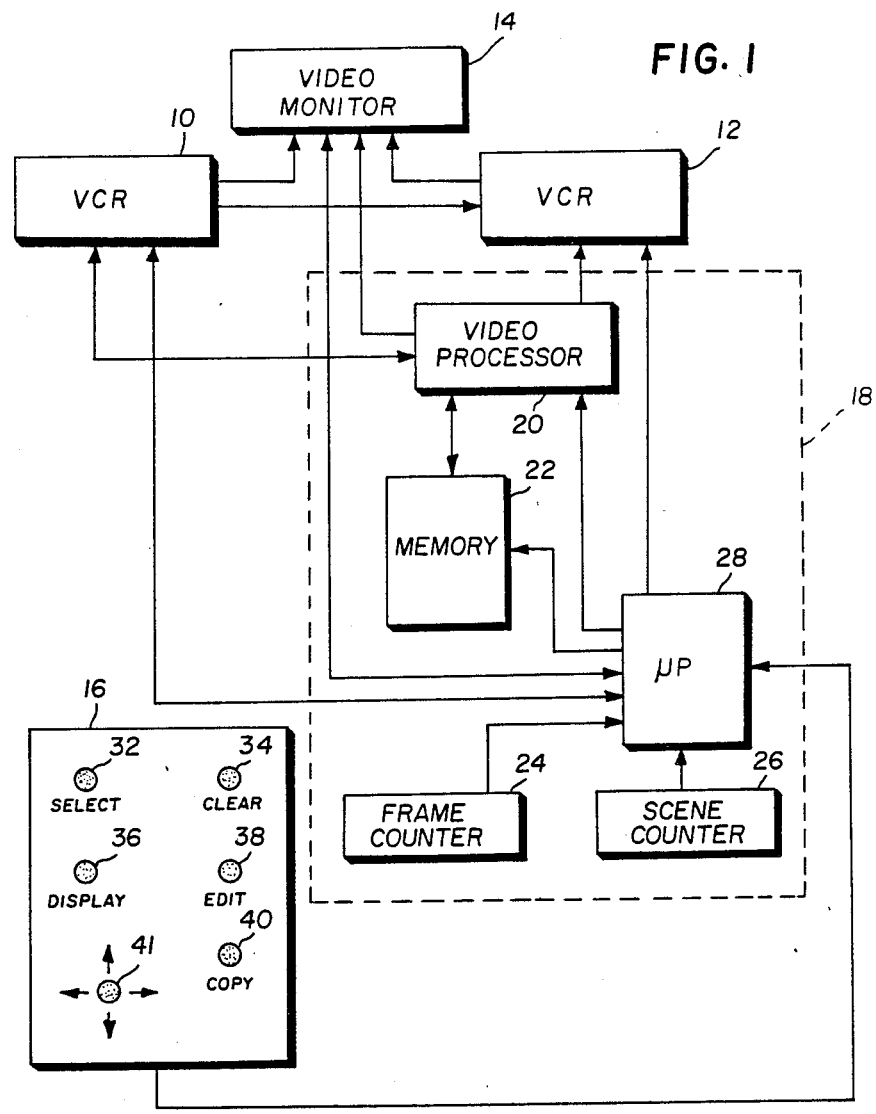
FIG. 1 is a block diagram of a video tape system incorporating the apparatus of the present invention.

Referring now to the figures, there is shown a video system incorporating the editing technique of the present invention. As shown in FIG. 1, the video system includes a first video cassette recorder (VCR) 10, a second video cassette recorder 12, a video monitor 14, a control 16, and control circuit 18. Control circuit 18 includes a video processor 20, a memory 22, a frame counter 24, a scene counter 26, and a microprocessor 28. Control 16 includes a "select" button 32, a "clear" button 34, a "display" button 36, an "edit" button 38, a "copy" button 40 and joystick 41 which may be selectively moved up, down, left or right to move a pointer on the screen of video monitor 14 (as will be described in greater detail later).

As explained later in greater detail, reduction of a video frame is effected by video processor 20 which samples the picture elements of the frame as a function of the reduction factor. In the NTSC format there are 525 lines per frame. The ratio of the picture width to height (aspect ratio) is 4/3, so that there are $525 \times 4/3 = 700$ picture elements per line. Of the 367,500 ($525 \times 700$) picture elements in a frame only about 280,000 ($\approx 480$ lines $\times$ 580 elements/line) elements contribute to the visible image due to vertical and horizontal blanking intervals. As an example, if four frames are to be stored in reduced format in memory 22, processor 20 would sample the visible area of a frame and store every fourth picture element in memory 20 by skipping every other line and storing every other element in that line. Other reduction ratios may be effected in the same manner.

Figure 2:
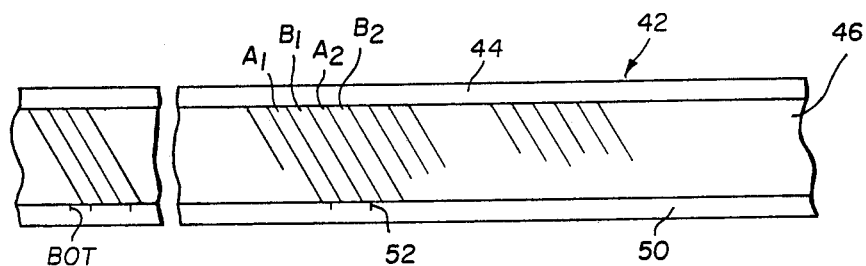
FIG. 2 is a diagrammatic view of a segment of video tape.

Video cassette recorders 10 and 12 are of standard design and accept cassettes of magnetic tape in the standard formats of Beta, VHS, 8 mm, or the like. As shown in FIG. 2, a length of magnetic tape 42, as may be disposed in a video cassette, includes an audio track which extends longitudinally of tape 42, a video segment 46 upon which oblique tracks 48 of video information are recorded and a control track 50 which runs longitudinally of tape 42, and upon which control marks 52 are recorded for each frame of video information recorded on tape 42. In general, a frame of video information comprises two fields which are recorded on two tracks A and B for each frame. Thus, tracks $A_1$ and $B_1$ constitute a single frame, and tracks $A_2$ and $B_2$ constitute another frame of video information. Each control mark 52 constitutes an identifying mark for each frame so that by counting the number of control marks from a given point (such as a beginning of tape mark (BOT)), each frame may be identified by a unique frame number. In the 8 mm format, the unused cue track or the unused PCM area of a track could be used for frame marks.

Thus, video information recorded on a tape may be identified by beginning and end frame numbers. For example, a first segment of unedited video information might extend from frame 5 to frame 520, a second segment of unedited video information might extend from frame 521 to frame 1025, and a third segment of unedited video information might extend from frame 1026 to frame 1620. These segments of unedited video information may comprise programming material which has been recorded from broadcast or cable television, such as movies and television shows. Such segments may also comprise material originated by the operator through the use of a video camera such as travel scenes, birthday parties, etc. In each of these situations, it may be desirable to make a copy of the recorded video information on a second tape without reproducing certain unwanted segments. According to the present invention, there is provided a technique for editing video information recorded on a first magnetic tape for copying on a second magnetic tape which is simple to use and which provides a visual sampling of edited segments to assist in reordering the segments for copying.

Figure 3A:
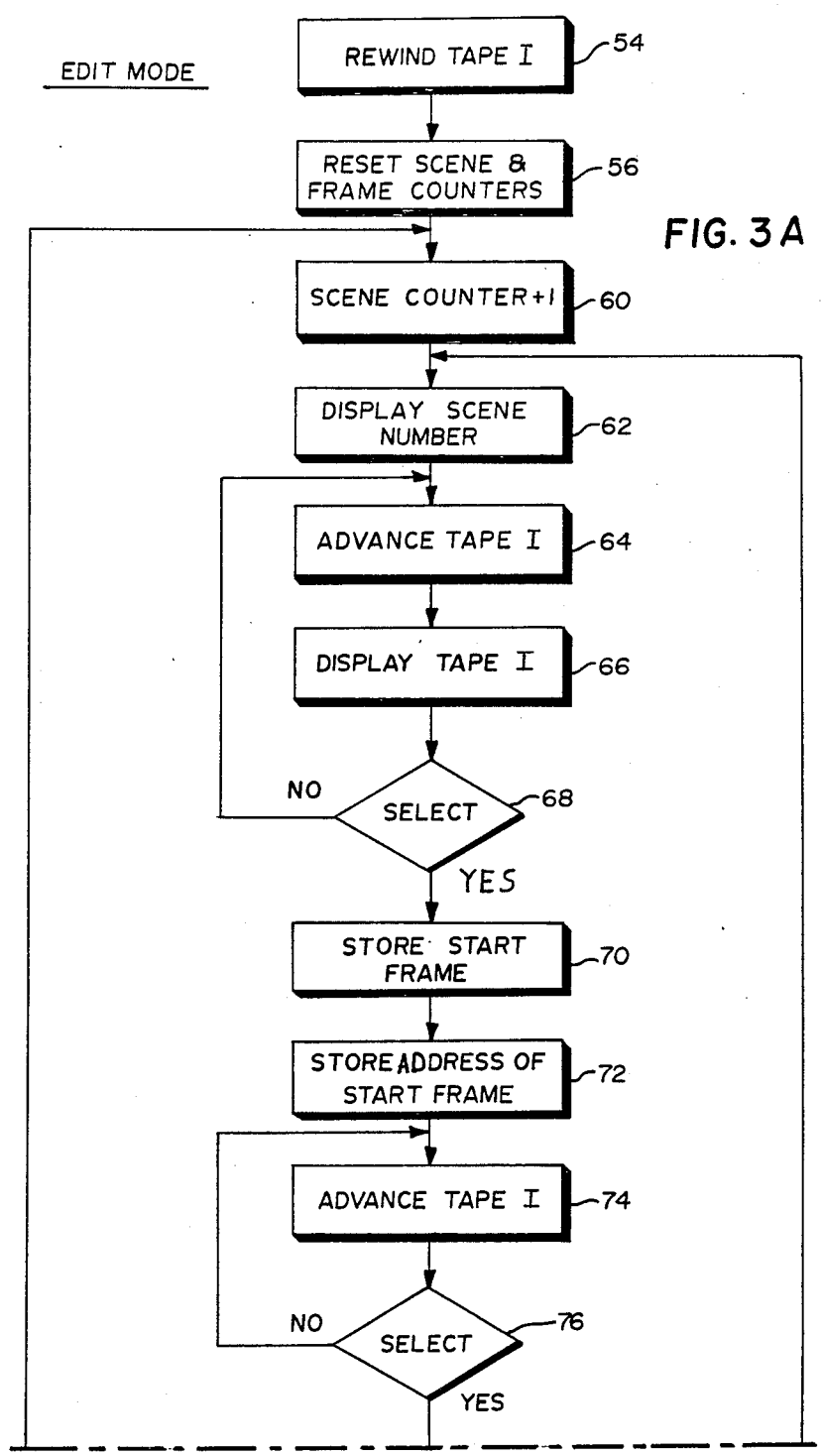
FIGS. 3A and 3B are flow diagrams of the EDIT mode of operation of the system of FIG. 1.
Figure 3B:
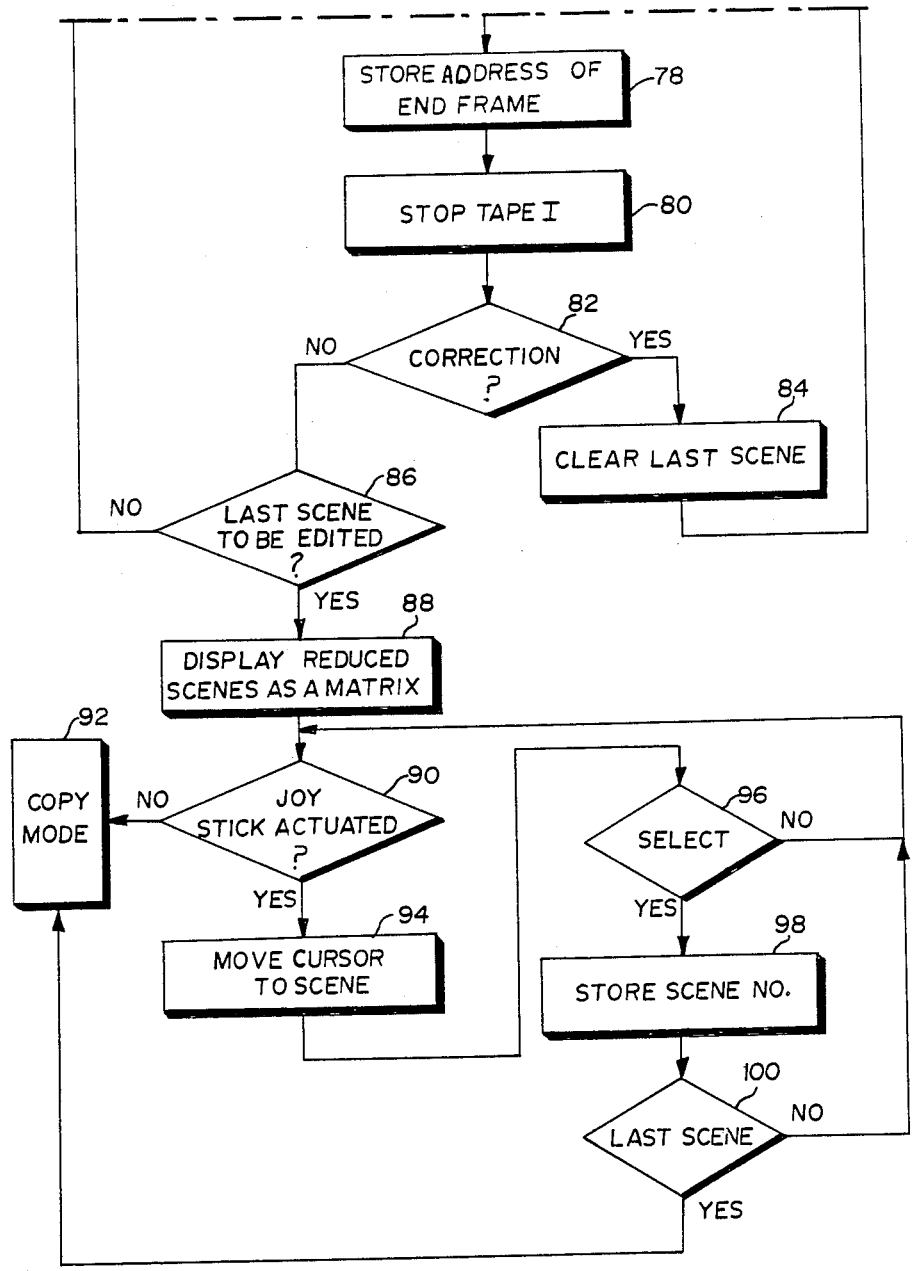

In FIG. 3 there is shown a flow diagram of the EDIT mode of operation of the present invention. When the operator actuates button 38 on control 16 a first magnetic tape (Tape I) with recorded video information in VCR 10 is rewound to the beginning of the tape position; and frame counter 21 and scene counter 26 are set to zero (boxes 54 and 56). Scene counter 26 is then incremented by one and the scene number displayed on video monitor 14 (boxes 60, 62). Tape I is then advanced and the video information recorded thereon displayed on monitor 14 (boxes 64, 66). As the video information is watched on monitor 14 by the operator, when a scene is displayed which constitutes the start of a segment which is to be edited, the operator actuates button 32 on control 16 (diamond 68). This causes the start frame of the segment to be stored in reduced format (as explained above at page 5, lines 12-29) in memory 22 and simultaneously the address of the start frame to be stored in memory 22 (boxes 70, 72). As the tape continues to advance (box 74), causing data to be displayed on monitor 14, the operator selects the end frame of the edited segment by actuating button 32 (diamond 76), which causes the address of the end frame to be stored in memory 22 (box 78).

Tape I is stopped to give the operator an opportunity to make any corrections (box 80). If a correction is to be made (diamond 82), the reduced format portion of the last edited segment is cleared from memory as well as the start and end addresses thereof (box 84), and the routine is returned to box 62. If there is no correction, a decision is made (diamond 86) whether or not the last scene has been edited. If it is not, then the routine is returned to box 60 and the operator selects further scenes to be edited and copied on magnetic tape II. For example, assume, as above, that magnetic tape I has unedited scenes of video information extending from frame 5 to frame 520, from frame 521 to frame 1025 and from frame 1026 to frame 1620. The operator may select an edited scene 1 which extends from frame 10 to frame 350 (within the first unedited scene), edited scene 2 which extends from frame 550 to frame 1000 (within the second unedited scene), and edited scene 3 which extends from start frame 1050 to end frame 1600 (within the third unedited scene).

When the last scene to be edited has been selected, (diamond 86) the operator actuates "display" button 36 to display the reduced format scene portions stored in memory 22 as a matrix on screen 58 of monitor 14 (box 88) (FIG. 5).

The operator may now select the order of the edited scenes to be copied on tape II. If the order of copying is unchanged from the order recorded on tape I, the operator actuates "copy" button 40 and the copy mode of operation (FIG. 4) is effected by control circuit 18 (diamond 90, box 92). If the order of edited scenes is to be changed, the operator moves joystick 41 (diamond 90) on control 16 to position cursor 43 on screen 58 at the first scene to be duplicated (box 94). For example, as shown in FIG. 5, the operator may wish to have scene 20 copied first. After the cursor 43 has been positioned at the appropriate scene, the "select" button 32 is actuated (diamond 96), and the scene number selected is stored in memory 22 (box 98). If the select button 34 is not actuated, the routine is returned to diamond 90.

When the least scene has been selected (diamond 100), the operator actuates "copy" button 40 on control 16 and the COPY mode of operation is effected by control circuit 18 (box 92).

Referring now to FIG. 4, the COPY mode routine will be described. In this mode, magnetic tape I in VCR 10 is rewound to the beginning (box 106) and the scene and frame counters are reset to zero (box 108). The number of the first scene to be copied and its start and end addresses are then read from memory 22, and tape I is moved in VCR 10 to the start address of the first scene to be copied (boxes 110, 112). Tapes I and II are advanced by VCRs 10 and 12 respectively, and the scene is copied on tape II from tape I (boxes 114, 116). When the end frame of the scene is copied, tapes I and II are stopped by VCRs 10 and 12 (box 118). If other scenes are to be copied (diamond 120), the routine is repeated until the last scene designated for copying from tape I has been recorded in proper order on tape II. Thus, for example, if there were five edited scenes (1–5) originally sequentially recorded on tape I, the operator may select to copy the scenes in the order scenes 5, 3, 1, 2, 4 on tape II. In the copy mode, control circuit 18 controls VCRs 10 and 12 to effect the designated order of copying.

After all the scenes have been copied, the control circuit 18 causes tape I and II to be rewound by VCRs 10 and 12, respectively (box 122). A second tape may be copied of the same quality or the operator may wish to edit the scenes in a different sequence. The data stored in memory 22 may be stored in permanent memory such as in a floppy disk or the like for use in a computer or other tape system for later reuse. Tape I may be removed from VCR 10 and reused if there is no intention of saving the original video information recorded thereon. Tape II may be removed from VCR 12 and stored. Tape II may be used as a master tape for producing further copies.

Although the technique of the present invention has been described with respect to copying video information from one magnetic tape to another magnetic tape, it will be understood that the edited information could be copied on other recording media such as magnetic or optical discs or the like. It will also be understood that a frame, field or some other portion of a scene may be stored in reduced format in memory 22. Moreover, memory 22 may comprise an analog memory, a digital memory, or a hybrid analog/digital memory.

The location of the beginning and end of an edited scene or segment may be identified by the position of the start and end frame or field with respect to the beginning of tape or with respect to some other location on the tape such as the mid point of the tape. Although counting of control marks on the tape is a preferred technique for determining the edited segments, other techniques may be used. Thus, the duration of time from some known position on the tape (such as the beginning of tape) may be measured, or the number of revolutions of supply or take up reels or of a tape drive capstan may be measured to determine location of edited segments on the tape. Moreover, an edited scene or segment may comprise a still scene of a single field or frame such that the start and end addresses or locations thereof are the same. The present invention allows copying of one tape by skipping unwanted segments such as commercials or the like.

The invention has been described in detail with particular reference to preferred embodiments thereof, but it will be understood that variations and modifications can be effected within the spirit and scope of the invention.

What is claimed is:

1. A video tape editing method comprising:
    playing back for display on a video monitor video information recorded on a first magnetic tape;
    designating the start and end locations of segments of video information on said first magnetic tape to be recorded on a second magnetic tape;
    upon designation of a start location of a segment to be recorded, temporarily storing in memory in reduced size only, a portion at the start of each designated segment and, simultaneously, the start location on said first tape of each such segment;
    upon designation of the end location of said segment to be recorded, storing in memory the end location on said first tape of each such segment;
    displaying the reduced format segment portions stored in said memory in a matrix on said monitor;
    selecting from said matrix display the order in which said designated segments of video information on said first tape are to be duplicated; and
    controlling the playback of said first magnetic tape so that the designated segments of video information are recorded on said second magnetic tape in said selected order.

2. The method of claim 1 wherein in designating the start and end locations of segments of video information on said first magnetic tape to be recorded on a second magnetic tape, said segments include start and end fields or frames which are different or are the same, and the location of said segments are designated by designating said start and end field or frames of each such segment.

3. The method of claim 2 wherein, upon designation of a start field or frame of a segment to be recorded, temporarily storing at least a portion of said start field or frame in reduced size only in memory along with the location of said start field or frame and, wherein upon designation of said end field or frame of said segment, storing in memory the location of said end field or frame.

4. In a video system including at least a video tape player, a video tape recorder and a video monitor, the improvement comprising:
    means for causing said video tape player to playback on said video monitor video information recorded on a first magnetic tape;
    means for designating the start and end locations of segments of video information on said first magnetic tape which are to be copied on a second magnetic tape;
    a memory;
    means for temporarily storing in said memory (1) upon designation of a start location of a segment to be copied, both a start portion in reduced size only of each designated segment of video information and, simultaneously, the start location on said first tape of each such segment, and (2) upon designation of an end location of said segment, such end location;

means for effecting the display of the reduced format portions in said memory in a matrix on said monitor;

means for selecting from said matrix display the sequence in which said designated segments of video information on said first tape are to be recorded on a second magnetic tape; and means for controlling (1) said video tape player so that said designated segments of video information on said first magnetic tape are played back in said selected order and (2) said video tape recorder for sequentially recording said played back video information on a second magnetic tape.

5. In a video system including a video tape player, a video tape recorder and a video monitor, the improvement comprising:

means for causing said video tape player to playback on said video monitor video information recorded on a first magnetic tape;

means for designating the start and end fields or frames of segments of video information on said first tape to be copied by said video tape recorder on a second magnetic tape;

a memory;

means for temporarily storing in said memory (1) upon designation of a start field or frame of a segment to be copied, in reduced size only at least a portion of said start field or frame of each segment and simultaneously, the location of each said first field or frame, and (2) upon designation of an end field or frame of a segment to be copied, the location of the end field or frame of each such segment;

means for effecting the display of the reduced size portions in said memory in a matrix on a monitor;

means for selecting from said matrix display the sequence of video information on said first tape that are to be copied on a second magnetic tape; and means for controlling (1) said video tape player so that said designated segments of video information on said first magnetic tape are played back in said selected order and (2) said video tape recorder for sequentially recording said played back video information on a second magnetic tape.

6. In a video system including a video tape player, a video tape recorder and a video monitor, the improvement comprising:

a memory; and control means for controlling said video tape player, said video tape recorder, said video monitor, and said memory (1) in an edit mode in which said video tape player plays back video information recorded on a first tape for display on said video monitor, in which a start location of a designated segment to be copied is stored in said memory simultaneously with the temporarily storage in memory of at least a reduced size portion only of video information at the start of said segment, in which an end location of a designated segment is stored in memory, in which the reduced size segment portions stored in said memory are displayed in a matrix on said video monitor and in which the order in which said designated segments are to be copied is selected from said matrix display and (2) in a copy mode, in which said video tape player plays back from said first magnetic tape the designated segments of video information in the order selected in the edit mode and in which said video tape recorder sequentially records said played back video information on a second magnetic tape.

* * * * *